(12) United States Patent
Hu et al.

(10) Patent No.: US 9,247,600 B2
(45) Date of Patent: Jan. 26, 2016

(54) LED ACTUATING DEVICE AND METHOD

(71) Applicant: Jun Hu, Guangzhou, Guangdong (CN)

(72) Inventors: Jun Hu, Guangdong (CN); Yongming Deng, Guangdong (CN); Ping Liu, Guangdong (CN)

(73) Assignee: Jun Hu, Guangzhou, Guangdong (CN)

( * ) Notice: Subject to any disclaimer, the term of this patent is extended or adjusted under 35 U.S.C. 154(b) by 0 days.

(21) Appl. No.: 14/529,250

(22) Filed: Oct. 31, 2014

(65) Prior Publication Data
US 2015/0123573 A1 May 7, 2015

(30) Foreign Application Priority Data

Nov. 3, 2013 (CN) .......................... 2013 1 0548033

(51) Int. Cl.
| G05F 1/00 | (2006.01) |
| H05B 37/02 | (2006.01) |
| H05B 39/04 | (2006.01) |
| H05B 37/00 | (2006.01) |
| H05B 33/08 | (2006.01) |

(52) U.S. Cl.
CPC ............. *H05B 33/0842* (2013.01); *Y02B 20/42* (2013.01)

(58) Field of Classification Search
None
See application file for complete search history.

(56) References Cited

U.S. PATENT DOCUMENTS

| 2007/0057902 A1* | 3/2007 | Joung, II ....................... 345/102 |
| 2007/0085494 A1* | 4/2007 | Takeda et al. ................. 315/316 |
| 2013/0249419 A1* | 9/2013 | Zhang et al. .................. 315/186 |

* cited by examiner

*Primary Examiner* — Anh Tran
(74) *Attorney, Agent, or Firm* — Bacon & Thomas, PLLC

(57) ABSTRACT

An LED actuating device comprises an LED actuating module, the LED actuating module comprises a micro-programmed control unit (MCU), a VF-value detection module, an actuator and an LED lamp unit; the MCU receives the VF value detected by the VF-value detection module; when the VF value is greater than or equal to a first boundary value, the LED lamp unit is actuated to operate in the constant current area at the first constant actuating current by the actuator; when the VF value is less than the first boundary value, the LED lamp unit is actuated to operate in the regulation area at the continuous step-down actuating current by the actuator until the VF is equal to the second boundary value, and the second boundary value is less than the first boundary value.

11 Claims, 5 Drawing Sheets

LED ACTUATING DEVICE AND METHOD

FIELD OF THE INVENTION

The invention relates to illumination and particularly relates to an LED actuating device and method.

BACKGROUND OF THE INVENTION

An LED semiconductor luminescent device comprises a semiconductor light-emitting diode (LED), a nixie tube, a symbol tube, a *-shaped tube and a dot-matrix display screen (hereinafter referred to as a "matrix tube"), etc. In fact, each light-emitting unit in the nixie tube, the symbol tube, the *-shaped tube and the matrix tube is a light-emitting diode.

The performances of an LED are determined by parameters and some key parameters related to the LED are as follows: (1) Allowable power dissipation Pm, which refers to the maximum value of the product between the forward DC voltage allowed to be applied on both ends of the LED and the passing-through current. If the value is exceeded, the LED becomes hot and damaged. (2) Maximum forward DC current IFm, which refers to the allowable maximum forward DC current. If the value is exceeded, diodes can be damaged. (3) Inverse peak voltage VRm, which refers to the allowable maximum inverse peak voltage. If the value is exceeded, the light-emitting diode can be broken down and damaged. (4) Operating environment (topm), which refers to the range of the environment temperature for normal operation of light-emitting diodes, and if the operating environment is beyond the temperature range, the light-emitting diodes cannot operate properly, with the efficiency greatly reduced. (5) Forward operating current If, which refers to the forward current value when the light-emitting diode operates normally. In actual use, the IF should be selected below 0.6 IFm as required. (6) Forward operating voltage VF: the working voltage given in the parameter list is achieved in the given forward current and usually measured when IF=20 mA. The light-emitting diode has forward operating voltage VF at 1.4~3V. When the external temperature rises, the VF decreases. (7) V-I characteristics: the relationship between voltage and current of a light-emitting diode is that the forward voltage is just less than a certain value (called as a threshold value), the current becomes extremely low and the diode cannot be lighted up. When the voltage exceeds the value, the forward current rises rapidly along with the voltage, and the light-emitting diode is lighted up.

Currently, at home and abroad, the LED is actuated by means of constant voltage or constant current; no matter under numerical control or simulation control, when a constant-current and constant-voltage LED actuating power supply is equipped to actuate the LED lamp unit, the constant-voltage or constant-current control technology is adopted during operating no matter how great the VF value of the LED lamp unit is changed, the output voltage and current coincide with the rate value of the lamp unit; the VF values are different for different LED lamp units from different manufacturers, especially the VF value consistency is much poorer for the LED lamp units from those of the factories with a less advanced packaging technology, and after lamp beads completely different in the VF value consistency constitute a lamp unit, with the rising of the LED working temperature, the VF value changes and begins to drift and decrease at the impact of the temperature, but the existing LED power supply sources all have a constant voltage or constant current, so it is completely impossible to adjust the output current and voltage according to the serious drift of the VF value when the LED lamp unit is exposed to a high temperature, thus forcing the LED lamp unit to operate under the condition of low VF voltage and constant current. As a result a direct negative impact that the PN-junction temperature of the LED will continue to rise to speed up light depreciation, flickering and life shortening of the LED lamp unit is brought.

For example, in time of constant-current actuating: when the output voltage and current of an LED actuating power supply is 36V and 2.4 A respectively, the output power should be 86 W; when the temperature rises and the VF value falls, the output voltage will then have tiny changes: 30V, 2.4 A, the output power is 72 W, and the LED lamp unit temperature continues rising to cause the continuous deceasing of the VF value due to the constant-current 2.4 A actuating, while the actual luminous flux of the LED lamp unit is greatly reduced due to lowering of the VF value, and light depreciation, flickering and color temperature deviation of the LED lamp beads can be speeded up when a constant current passes through. In time of constant-voltage actuating: when the output voltage and current of the LED actuating power supply is 36V and 2.4 A respectively, then the output power should be 86 W; when the temperature rises and the VF value decreases, the feedback regulation function of the constant-voltage actuator adjusts the output voltage to 36V, the output current rises to 2.6 A instead, and the output power also rises to 93.6 W, the continuous rising of the PN-junction temperature of the LED lamp unit results in continuous decreasing of the VF value. Moreover, at the moment, the feedback regulation constant-voltage function of the constant-voltage circuit causes the current to further rise, and the power continuously is kept out of limits, which results in burning of the LED lamp unit.

SUMMARY OF THE INVENTION

Aiming at the existing defects in the existing technology, the invention provides an LED actuating device and method.

Technical Solution 1: a kind of LED driving method, comprising the following steps:

detecting the forward operating voltage value;

when the forward operating voltage value is greater than or equal to the first boundary value, actuating the LED lamp unit to operate in the constant current area with the first constant actuating current;

when the forward operating voltage value is less than the first boundary value, actuating the LED lamp unit to operate in the regulation area with the continuous step-down drive current until the forward operating voltage is equal to the second boundary value and the second boundary value is less than the first boundary value; and when the forward operating voltage value is equal to the second boundary value, actuating the LED lamp unit to operate in the balance area at the second constant actuating current.

Technical Solution 2: the method as claimed in technical solution 1, further comprising the following step: setting up an overlap area between each or multiple steps of the continuous step-down drive current.

Technical Solution 3: according to the method as described in technical solution 1, further comprising the following step: setting up overlap areas between the balance area and the regulation area or between the regulation area and the constant current area.

Technical Solution 4: the method as claimed in technical solution 2 or Technical Solution 3, comprising the following step: when the forward operating voltage value first detected decreases within the overlap area, adjusting the current to any of the multiple current values covered by the overlap area.

Technical Solution 5: the method as claimed in technical solution 1, wherein the number of the steps is a positive integer, with each step identical or different in width and height.

Technical Solution 6: the method as claimed in technical solution 1, wherein the MCU contains a performance data proofreading base of the temperature values, and searches the current value corresponding to the detected temperature value as the current value matched with the LED lamp unit.

Technical Solution 7: the method as claimed in technical solution 1, comprising the following step: when the detected PN-junction temperature exceeds the operating ambient temperature (topm), stopping actuating the LED lamp unit by the MCU.

Technical Solution 8: the method as claimed in technical solution 1, comprising the following steps: produce the PWM pulse matched with the actuating current, sending the PWM pulse to the LLC resonant half-bridge driver by an optocoupler, actuating the half-bridge circuit (composed of two MOS tubes) to be on and off by the LLC resonant half-bridge actuator, sending the output of the half-bridge circuit to the schottky diode rectifier circuit by the isolation transformer, and then outputting a stable DC current to supply the LED lamp unit by the schottky diode rectifier circuit.

Technical Solution 9: the method as claimed in technical solution 1, comprising the following step: acquiring the value of the current passing through the LED lamp unit, and adjusting the PWM pulse width based on the difference between the acquired current value and the target current value.

Technical Solution 10: the method as claimed in technical solution 1, comprising the following steps: lightning protection surge filtering, EMI filtering, bridge rectifying and power factor correction.

In addition, the invention also discloses:

An LED actuating device, comprising an LED actuating module, the LED actuating module comprising a MCU, a VF-value detection module for detect the forward operating voltage value, an actuator and an LED lamp unit; wherein the MCU receives the forward operating voltage value detected by the forward operating voltage value detection module, and when the forward operating voltage value is greater than or equal to the first boundary value, the LED lamp unit is actuated to operate in the constant current area at the first constant actuating current by the actuator;

when the forward operating voltage value is less than the first boundary value, it drives the LED lamp unit to work in the regulation area through the driver at a continuous step-down drive current until the forward operating voltage value is equal to the second boundary value and the described second boundary value is less than the first boundary value;

when the forward operating voltage value is equal to the second boundary value, the LED lamp unit is actuated to operate in the balance area by the driver at the second constant drive current.

The invention has the beneficial effects as follows: According to the working characteristics of the LED lamp unit, constantly the actuating current of the LED lamp unit is adjusted constantly by detecting the temperature value and VF value of the LED lamp unit, so that the LED lamp unit can not necessarily operate at the rated current originally designed when the VF value drops, thereby lowering the overall temperature of the lamp unit, also lowering the PN-junction temperature of the LED lamp unit and simultaneously prolonging the service life of the LED lamp unit on the basis of lower power consumption.

DETAILED DESCRIPTION OF THE PREFERRED EMBODIMENTS

The invention is described further in conjunction with the figures. It can be understood that the embodiments are only used for illustrating the present invention rather than limiting the scope of the present invention. In addition, after the authorized content of the invention is read, various variations or modifications of the invention can be made by those skilled in the art, and the equivalent forms are also considered to be within the range limited to the claims attached in the invention.

Figure 1:
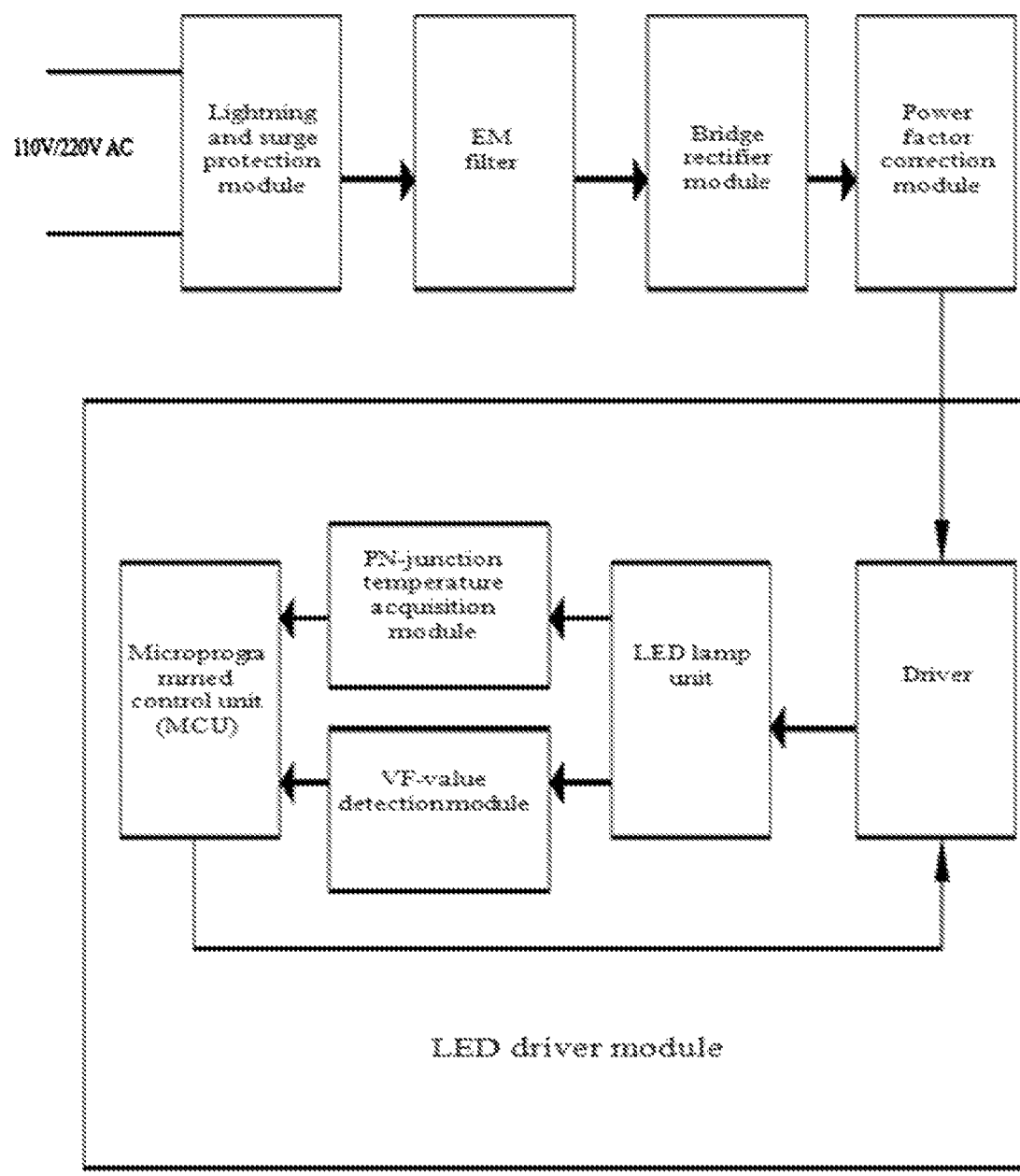
FIG. 1 is the schematic diagram of the LED lamp unit actuating device.

FIG. 1 is the schematic diagram of the LED lamp unit actuating device, and the LED actuating device comprises a lightning and surge protection module, an EMC EMI filter module, a bridge rectifier module, a power-factor correction module (APFC) and an LED actuating module.

Wherein, the lightning and surge protection module is used for eliminating the impact of lightning stroke or surge voltage; the EMI filter is used for preventing the high-frequency interference generated by the actuator from returning to the power line, the full-bridge rectifier is used for converting AC power to DC power, and the APFC circuit of the power factor corrector is used for controlling the waveform of the AC input current to follow the waveform of the voltage well, improving the power factor to be higher than 0.99 and regulating the width of different pulses according to different output currents, reducing the power grid harmonic waves and producing an adjustable DC bus voltage to output to the LED actuating module.

The LED driver module comprises a micro-programmed control unit (MCU), an LLC resonant half-bridge driver, a VF-value detection module for detecting the operating voltage value in the forward direction, a PN-junction temperature acquisition module and an LED lamp unit;

The PN-junction temperature acquisition module acquires the PN-junction temperature and transmits the acquired temperature signal to the MCU; the LLC resonant half-bridge driver is used for adjusting the current through the LED lamp unit based on the actual current value matched with the MCU; the VF-value detection module is used for detect the VF value of the LED lamp unit and transmitting the detected VF value to the MCU; the actuator provided by the invention improves efficiency of the actuating device by an LLC resonant topology structure, the preceding stage of the actuator to achieves AC/DC conversion and APFC functions by adopting a booster (Boost) topology in the critical current mode (BCM), the latter stage builds up a DC/DC preset constant current source by adopting an LLC resonant half-bridge topology, and the two-stage structure can make full use of the high-efficient characteristics of the Boost and LLC resonant.

The MCU is used for controlling the operation of the LED lamp unit, adjusting the current of the LED lamp unit based on the detected PN-junction temperature signal and VF value, and moreover detect short circuit, overcurrent, overvoltage and other relevant parameters so as to protect the LED actuating module, for example, when the PN-junction temperature value acquired by the PN-junction temperature acquisition module exceeds the operating ambient temperature (topm), then the MCU stops driving the LED lamp unit. The MCU provided by the invention comprises microprocessors, such as SCU, DSP and memory modules, can be used to storing the necessary programs and data; moreover, the MCU also comprises A/D converters, PWM output modules and communication interfaces, etc.

Figure 2:
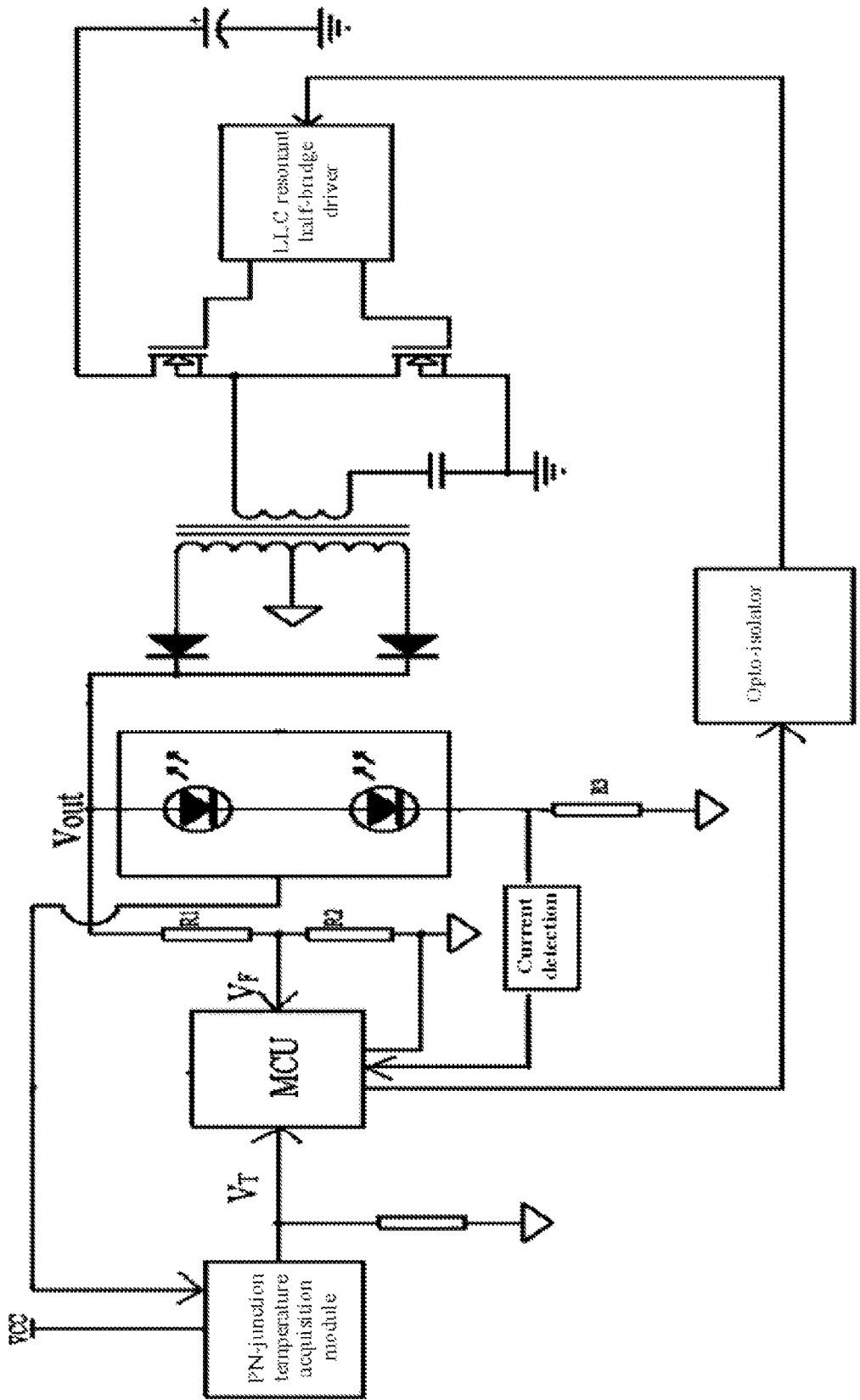
FIG. 2 is the schematic diagram of the LED actuating module.

FIG. 2 is a detailed execution mode of the LED actuating module. The PN-junction temperature acquisition module as shown in FIG. 2 converts the collected temperature signal into voltage signal VT which then is transmitted to the MCU, and the MCU can judge the environmental temperature before the lamp starts to operate according to the VT signal value. At the same time, the module can dynamically detect the PN-junction temperature after the lamp unit has been working for a period of time and transmit the collected PN-junction temperature data to the MCU, and the MCU forms an LED unit output voltage bleeder circuit by the resistors R1 and R2 to acquire the VF voltage value of the LED lamp unit, determines the actuating current matched with the LED based on the VF value to obtain the actuating current matched with the LED lamp unit, calculates the PWM duty ratio to be output based on the obtained actuating current value, and then outputs the PWM pulse corresponding to the duty ratio by an opto-isolator to further reach the actuating half-bridge circuit and adjusts the current of the LED lamp unit; when the current of the LED lamp unit is required to be adjusted to rise, the MCU PWM pulse width is widened, sent to the grid electrodes of the two MOS tubes in the half-bridge circuit by an opto-coupler and then output by an isolation transformer, secondary windings of the isolation transformer outputs a stable DC current to enable the LED lamp unit to operate, and thus increasing the operating current of the LED lamp unit after rectification by two schottky diodes, and when the current of the LED lamp unit becomes lower, the MCU PWM pulse width becomes narrower, thereby reducing the running current of the LED lamp unit; in this way, the running current of the LED lamp unit is kept constant dynamically. The LED actuating module also comprises a current detection module which is connected between the resistor R3 and the controller and is used for detecting the current value by the LED lamp unit, comparing the detected current value with the target current value (the matched current value) and adjusting the PWM pulse width according to the difference of the two values to constitute a closed-loop control, so that the actuating current could be more precisely adjusted. An introduction on how to obtain the matched actuating current value according to the VF value is further made.

First Embodiment

When the LED operates, the VF value is changed while the LED operating temperature rises. particularly, as the time extension of the lamp, the temperature of the LED lamp unit rises, and the temperature of the PN-junction of the LED lamp also rises, so that the VF value of the LED decreases, and when the VF value changes, the actuating current value of the LED is adjusted, so that the actuating current can be adaptive to the VF value and the PN-junction temperature VT. The relevant research shows that when the VF value is greater than a certain value, a constant current can be used for actuating the LED, and the change of VF higher than the value impacts little on the LED device, and the brightness/luminous flux of the LED device basically can be kept stable within the range of naked eyes, so that the LED device can operate stably, but when the VF value continues to drop lower than the value, for example, when it is reduced to 3.15V, if the LED is actuated by constant cutter, dramatic performance deterioration of the LED can be caused, the brightness/luminous flux can be depreciated gradually, flickering and color temperature deviation and other adverse conditions can be generated, so that the service life of the LED can be affected seriously. The value is called the first critical value $VF_a$, for example, when such conditions as depreciation, flickering and color temperature deviation occur during measurement of the brightness/luminous flux of the LED, the corresponding VF value is called the critical value $VF_a$.

Figure 3:
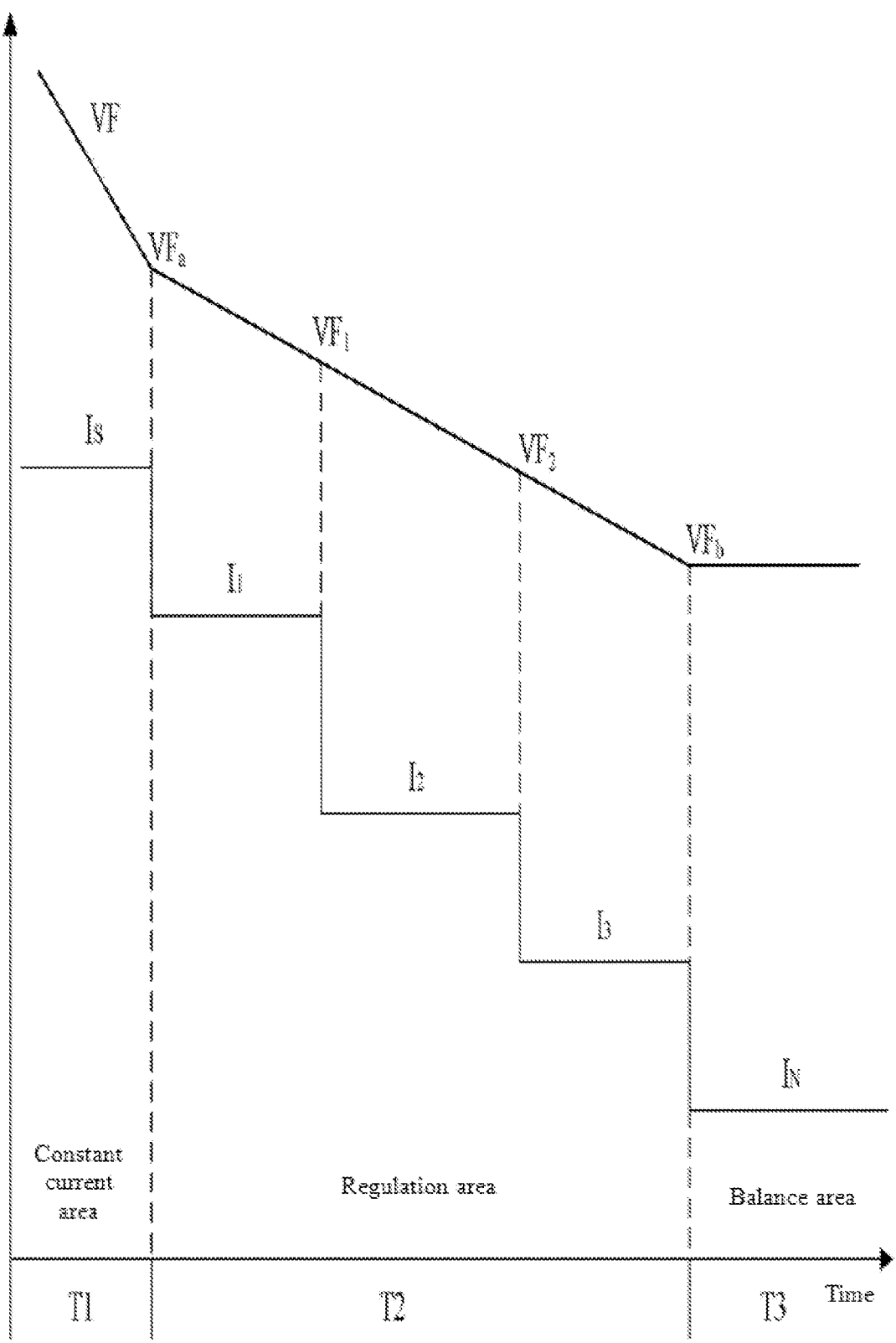
FIG. 3 is attached diagrams of the first embodiment.

When the VF value is less than the first critical value, the reduction of the actuating current value can narrow the decline of the VF value; after the current value is reduced to a certain value (IN), the heating and cooling of the LED are basically balanced, and the VF value basically remains unchanged, and the LED can operate stably for a long time, and the VF value capable of enabling the LED to operate stably for a long time is called the second critical value $VF_b$. Accordingly, as shown in FIG. 3, in the embodiment of the invention, the operating area of the LED is divided into three areas including a constant current area, a regulation area and a balance area, in which different currents are adopted to actuate different LED devices. A detailed description is as follows.

Constant current area: the VF value is greater than or equal to $VF_a$; after an LED lamp is turned on, the MCU reads the VF value measured by the VF value measurement module and determines whether the measured VF value is greater than the critical value $VF_a$; if the measured VF value is greater than $VF_a$, the LED is actuated at a constant current $I_a$, for example, the current can be regarded as the rated current $I_s$ of the LED.

Regulation area: as the operating time extension of the LED, the VF value gradually declines. After the VF value is detected to be less than $VF_a$, the LED starts to operate in the regulation area. The VF value is kept in the area between $VF_a$ and $VF_b$, in which the LED actuating current decreases in a continuous step-down manner. For example, if $VF_a$, $I_a$, $VF_b$ and $I_b$ are 3.2V, 300 mA, 2.6V and 200 mA respectively, then we can calculate the difference of the two (3.2−2.6=0.6) and calculate the VF value decline extent of each step according to the default number of steps. For example, if the number of steps is 3, then the VF value decline extent of each step should be 0.6/3=0.2 V, and then we can calculate the current decline extent of each step accordingly as 300−200=100,100/4=25 mA, so that the regulation area can be divided into three steps according the VF values. The VF value of the first step is 3.2–3.0, and the corresponding actuating current value is $I_1$ (275 mA); the VF value of the second step is 3.0–2.8, and the corresponding actuating current value is $I_2$ (250 mA); the VF value of the third step is 2.8–2.6, and the corresponding actuating current value is $I_3$ (225 mA). As shown in FIG. 3, the decline extent of the actuating current in each step determines the height of the step while the VF decline extent determines the width of the step. In this embodiment, the number of the steps is 3, each step is identical in height and width, but it is understood for a person skilled in the art that the number of steps can be any positive integer, such as 1, 5 and 9, and the height and width of each step can be identical or different. Thus, after the VF value is less than the first critical value $VF_a$, the LED can be actuated with the current comparatively matched with the VF value in the regulation area.

Balance area: when entering the regulation area, the LED firstly starts to operate in the first step, and the VF value is between 3.2 and 3.0, and then the LED is actuated with the actuating current of 275 mA. With extension of the operating time, the VF continues to decrease within the first linear step, and in time of entry into the second step, the current continues to be adjusted to be 250 mA and so on until the VF reaches $VF_b$, the value does not decrease no longer, and the LED lamp unit starts to operate into the balance area and operates safely for a long time in the mode of a constant current at the IN current.

The description above is about the LED actuating process. The VF value is always 0 before the lamp is turned on, but the ambient temperature/the PN-junction temperature of the LED are different, for example, such factors as different seasons, different LED surroundings and time duration from the time the LED was turned on last time all can have impact on the PN-junction temperature when the LED lamp unit is turned on. In order to determine the current value matched with the LED lamp unit when the lamp is turned on, according to the invention, the PN-junction temperature acquisition module is used for collecting the PN-junction temperature and transmitting the collected temperature signal to the MCU, and the MCU matches the LED lamp unit with corresponding actuating current value in the temperature performance data proofreading base according to the detected temperature value. Different temperature values of the LED lamp unit and the actuating current of the LED lamp unit corresponding to the temperature value are stored in the temperature performance data proofreading base, and the data in the temperature performance data proofreading base can be available from a series of data completed after sampling according to the characteristics of the LED lamp unit. Further introduction to the temperature performance data proofreading base is made below.

The temperature performance data proofreading base is used for determining the actuating current value matched with the LED lamp unit according to the detected temperature values. The particular setting procedures are as follows: If the temperature value changes, each time when the temperature of the LED lamp unit rises by 0.5-2 degrees, the current value is adjusted according to the expected brightness/luminous flux of the LED lamp unit, the current value is recorded when the expected brightness/luminous flux is achieved, the value is the actuating current value corresponding to the temperature, so that the actuating current value is matched with the actual luminous flux/brightness corresponding to the LED lamp unit. The value is stored in the default performance database, and a performance database is obtained.

When the detected temperature signal does not exist in the performance database, then the average value of the current values corresponding to the two temperature values adjacent to the temperature signal us calculated as the current value corresponding to the temperature signal, wherein the detected temperature signal is between the two temperature values adjacent to the temperature signal. In this way, the MCU can determine the actuating current matched with the LED lamp unit according to the temperature performance data proofreading base, so that the LED could obtain an appropriate matched current when the lamp is turned on.

Second Embodiment

In the embodiment, the difference from the first embodiment is focused, and the similarities are not repeated here. The difference from the first embodiment IS as follows: an overlap area is set between two steps, so that the oscillation in the process of the current regulation process can be reduced to prevent conditions of flashing and flickering, and the LED can operate more smoothly.

The size of the VF value is mainly determined by temperature, the higher the temperature is, the less the VF value is. The LED temperature is closely related with the operating current. In the case of constant cooling conditions, when the LED current increases, and the temperature rises due to heat increase and the VF value decreases; if the LED current reduces, the temperature declines due to heat decrease and the VF value increases.

In the first embodiment, during the process of regulation, for example, when the first step is switched to the second step, the actuating current turns to be $I_2$, and due to the current decline, the LED temperature has a short-term relative decline with the VF value slightly increasing, so that the VF value is higher than the lower limit $VF_1$ of the first step, and the LED actuating current jumps back to E. At this time, due to the high current $I_1$, the temperature rises, the VF value quickly decreases below the lower limit $VF_1$ of the VF range in the first step and falls into the second step again with the current jumping back to $I_2$. Accordingly, the process of current decrease-current increase-current decrease is repeated until the VF value is still less than $VF_1$ caused by actuating current decreasing, the LED can then be steadily switched from the first step to the next step. This will cause oscillation during current regulation and easily result in flashing, flickering and unsteady working of the LED. In order to overcome this problem, the current invention sets overlaps in the second preferred embodiment.

Figure 4:
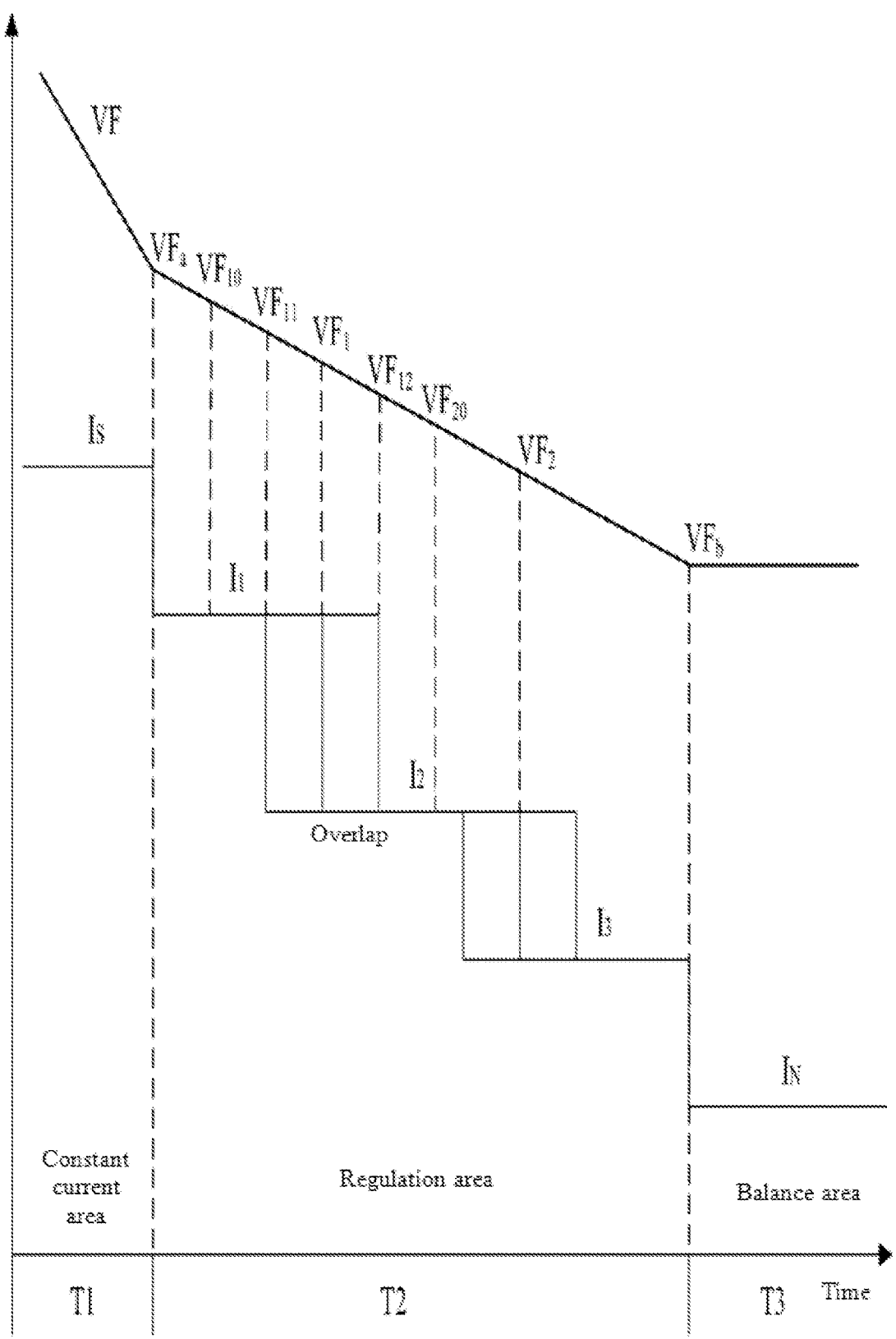
FIG. 4 is attached diagram of the second embodiment.

As shown in FIG. 4, similar to the first embodiment, the regulation area in the embodiment can also be divided into three steps, but an overlap area is set between two steps, and each overlap contains the lower limit of the corresponding step (i.e., the upper limit of the next step), and preferably, the lower or upper limit is located in the middle of the overlap area. In FIG. 4, two overlaps are schematically drawn, and are respectively located between the first step and the second step, and between the second step and the third step, but it is understood by technicians in the field that an overlap can be set between any two steps and that an overlap can also be set between the balance area and the regulation area or between the regulation area and the constant current area.

Taking the overlap between the first step and the second step as an example, the operating modes of other overlaps are similar, so unnecessary details are no longer offered here again. As shown in FIG. 4, the VF values corresponding to the overlap is $VF_{11}$-$VF_{12}$, wherein $VF_1 < VF_{11} < VF_a$, $VF_2 < VF_{12} < VF_1$, $VF_{12} < VF_1 < VF_{11}$. When the detected VF value is $VF_{10}$, then $VF_{11} < VF_{10} < VF_a$, at the time, the LED is actuated by the current $I_1$, and the operating mode for actuating the LED by the current $I_1$ is called the first operating mode. as the decreasing of the detected VF value, the value is lower than $VF_{11}$ and $VF_1$ sequentially, and the LED is still actuated by the current $I_1$ (i.e., still operates in the first mode), then the actuating current is adjusted to be $I_2$ until the detected VF value is lower than $VF_{12}$, and the operating mode with the LED actuated by the current $I_2$ is called the second operating mode. Similarly, when the detected VF value is $VF_{20}$, then $VF_2 < VF_{20} < VF_{12}$, at the time, the LED is driven by the current $I_2$, and the operating mode with the LED actuated by the current $I_2$ is called the second operating mode; while the detected VF value increases, the value is higher than $VF_1$ and $VF_{11}$ sequentially, the LED is still actuated by the current $I_2$ (i.e., still operates in the second mode) and then the actuating current is adjusted to be $I_1$ until the detected VF value is higher than $VF_{12}$.

When the VF value obtained for the first time falls into the overlap, the current $I_1$ or $I_2$ can be used for actuating the LED, so that the LED operates in the first or second mode, but not switched to the next operating mode until the detected VF value goes beyond the upper or lower limit of the current mode. Therefore, in the process of current regulation, the current oscillation can be avoided on the border of the steps.

Third Embodiment

Figure 5:
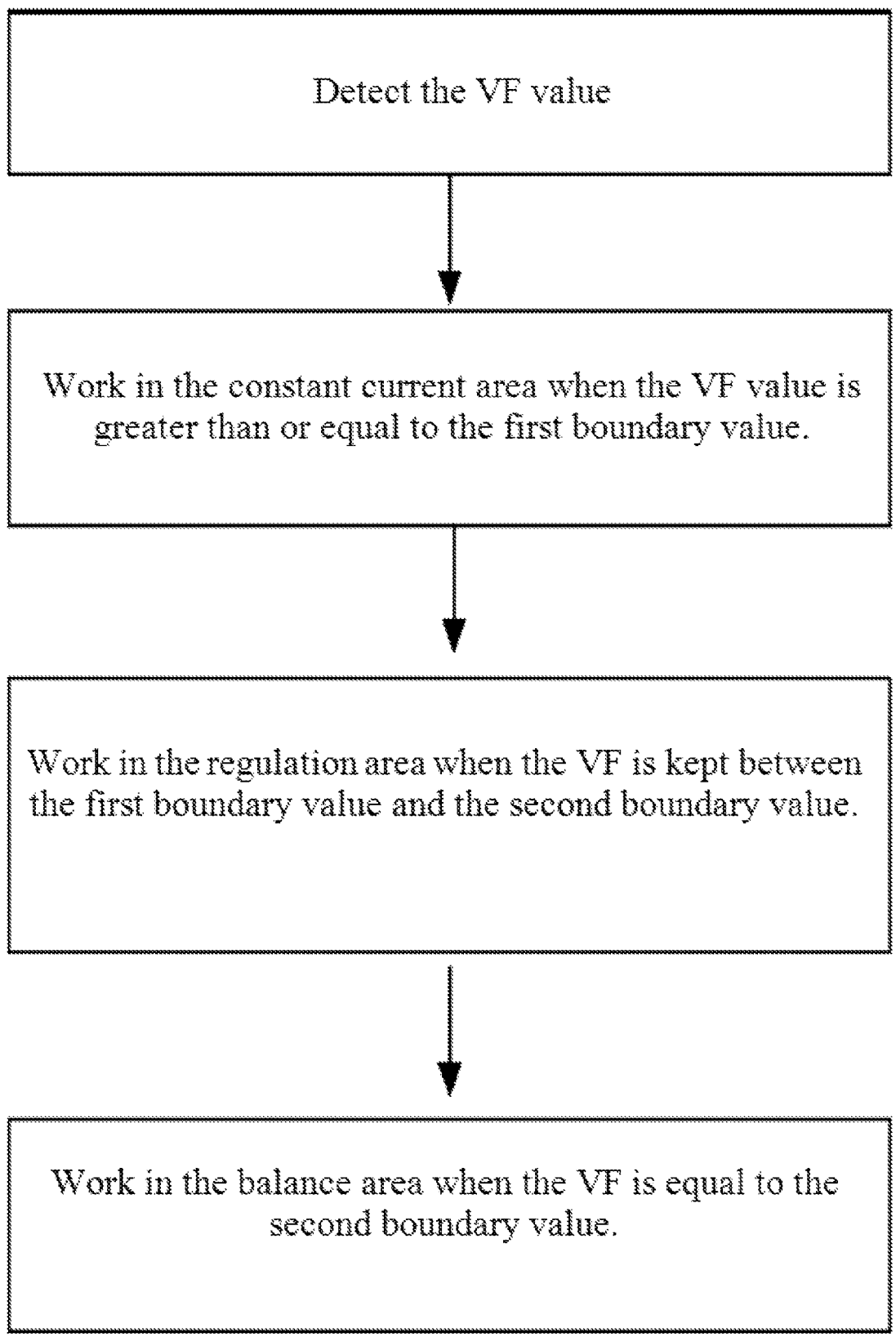
FIG. 5 is the flow chart for the LED actuating method.

As shown in FIG. 5, an LED actuating method is illustrated in the embodiment of the invention, wherein the LED actuating method comprises the following steps: detecting the VF value; when the VF value is greater than or equal to the first boundary value, actuating the LED lamp unit to operate in the constant current area at the first constant drive current; when the VF value is less than the first boundary value, actuating the LED lamp unit to operate in the regulation area at a continuous step-down actuating current until the VF is equal to the second boundary value, wherein the second boundary value is less than the first boundary value; and when the VF value is equal to the second boundary value, actuating the LED lamp unit to operate in the balance area at the second constant actuating current.

All the embodiments in the specification are described in a progressive manner with the emphasis put on the difference of each embodiment from others and the identical and similar details can be mutually quoted between any two embodiments. Any system-based embodiment is basically similar to a method embodiment, so the descriptions are simplified here, and the relevant contents can be referred to partial descriptions of the method embodiments.

The LED actuating device and method are described in details. particular examples are applied in the invention to expound the principle and execution methods of the invention, and the embodiments are only used for helping understanding the method and concept thereof; at the same time, modifications can be made by a person skilled in the art on the particular embodiments and application range in accordance with the concept of the invention. To sum up, of the description should not be interpreted as limiting the invention the invention is not limited.

What is claimed is:

1. An LED actuating device, comprising an LED actuating module, said LED actuating module comprising a MCU, a VF-value detection module for detecting the forward operating voltage value, an actuator and an LED lamp unit;
    wherein the MCU receives the forward operating voltage value detected by the forward operating voltage value detection module, and when the forward operating voltage value is greater than or equal to the first boundary value, the LED lamp unit is actuated to operate in the constant current area at the first constant actuating current by the actuator;
    when the forward operating voltage value is less than the first boundary value, the LED lamp unit is actuated to operate in the regulation area by the actuator at a continuous step-down actuating current until the forward operating voltage value is equal to the second boundary value and the second boundary value is less than the first boundary value; and
    when the forward operating voltage value is equal to the second boundary value, the LED lamp unit is actuated to operate in the balance area by the actuator at the second constant actuating current.

2. The device according to claim 1, further comprising an overlap area setting module for setting up mutual overlaps between each or multiple steps of the continuous step-down actuating current.

3. The device according to claim 2, wherein the MCU receives the forward operating voltage value detected by the forward operating voltage value detection module, and when the forward operating voltage value first detected falls within the overlap area, the current is adjusted to any of the multiple current values covered by the overlap area.

4. The device as claimed in claim 1, further comprising an overlap area setting module for setting up mutual overlaps between the balance area and the regulation area or between the regulation area and the constant current area.

5. The device according to claim 4, wherein the MCU receives the forward operating voltage value detected by the forward operating voltage value detection module, and when the forward operating voltage value first detected falls within the overlap area, the current is adjusted to any of the multiple current values covered by the overlap area.

6. The device according to claim 1, wherein aiming at each step of the continuous step-down actuating current, the number of the steps is a positive integer, with each step identical or different in width and height.

7. The device according to claim 1, further comprising a PN-junction temperature acquisition module for detecting the PN-junction temperature of the LED; wherein the MCU further comprises a performance data proofreading base of the temperature values, and searches the current value corresponding to the detected PN-junction temperature as the current value matched with the LED lamp unit.

8. The device according to claim 7, wherein when the PN-junction temperature value detected by the PN-junction temperature acquisition module exceeds the operating ambient temperature (topm), then the MCU stops actuating the LED lamp unit.

9. The device according to claim 1, wherein the actuator comprises an LLC resonant half-bridge actuator, a half-bridge circuit consisting of two MOS tubes, an isolation transformer and a schottky diode rectifier circuit; the MCU outputs the PWM pulse corresponding to the actuating current; the PWM pulse is sent to the LLC resonant half-bridge actuator by an opto-coupler; the LLC resonant half-bridge actuator actuates the half-bridge circuit to be on and off; the output of the half-bridge circuit is sent to the schottky diode rectifier circuit by the isolation transformer, and then the schottky diode rectifier circuit outputs a stable DC current to supply the LED lamp unit.

10. The device according to claim 9, further comprising a current acquisition module for acquiring the value of the current passing through the LED lamp unit, and then the MCU adjusts the PWM pulse width based on the difference between the acquired current value and the target current value.

11. The device according to claim 1, further comprising an optimal lightning and surge protection module which is connected to the power supply terminal and used for eliminating the impact of lightning stroke or surge voltage, an EMI filter which is connected to the lightning and surge protection module and is used for preventing high-frequency interference from returning to the power line, a bridge rectifier module which is connected to the EMI filter and is used for converting AC power to DC power, and a power-factor correction module which is connected to the bridge rectifier module and is used for increasing the power factor.

* * * * *